United States Patent [19]

Cuypers

[11] Patent Number: 4,661,089
[45] Date of Patent: Apr. 28, 1987

[54] ENDLESS METAL BELT

[75] Inventor: Martinus H. Cuypers, Eindhoven, Netherlands

[73] Assignee: Gayliene Investments Limited, Great Britain

[21] Appl. No.: 794,621

[22] Filed: Nov. 4, 1985

[30] Foreign Application Priority Data

Nov. 7, 1984 [NL] Netherlands .................. 8403388

[51] Int. Cl.⁴ ............................................. F16G 1/22
[52] U.S. Cl. .................................. 474/242; 474/265; 156/137
[58] Field of Search .................. 474/201, 242, 265; 156/137; 264/280, 265

[56] References Cited

U.S. PATENT DOCUMENTS

| 2,274,515 | 2/1942 | Yelm | 474/265 |
| 2,519,590 | 8/1950 | Mitchell | 474/265 X |
| 2,737,468 | 3/1956 | Waugh | 474/265 X |

FOREIGN PATENT DOCUMENTS

| 2330251 | 1/1975 | Fed. Rep. of Germany . |
| 2242608 | 3/1975 | France . |

Primary Examiner—Stephen J. Novosad
Assistant Examiner—Thuy M. Bui
Attorney, Agent, or Firm—Ostrolenk, Faber, Gerb & Soffen

[57] ABSTRACT

Endless metal belt particularly for a continuously variable transmission in which the tensile stresses during operation are decreased by incorporating compression stresses in at least the beld edge zones, for instance by plastic deformation of the belt material.

12 Claims, 10 Drawing Figures

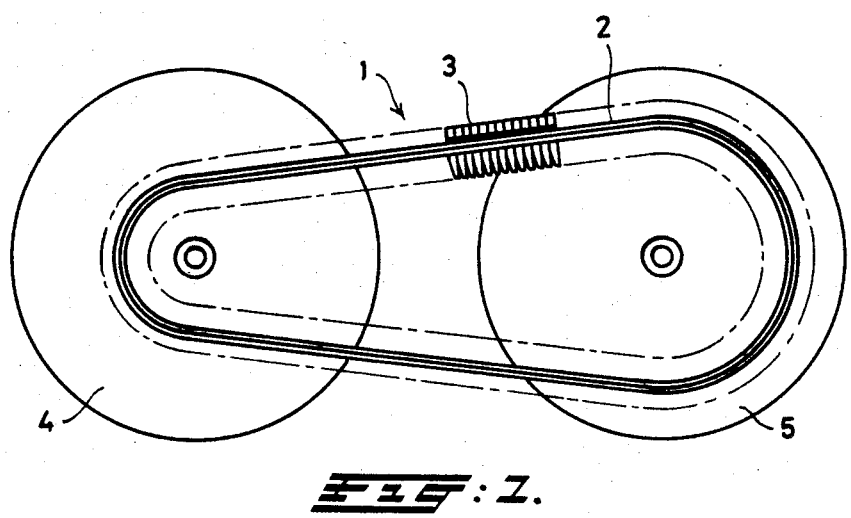

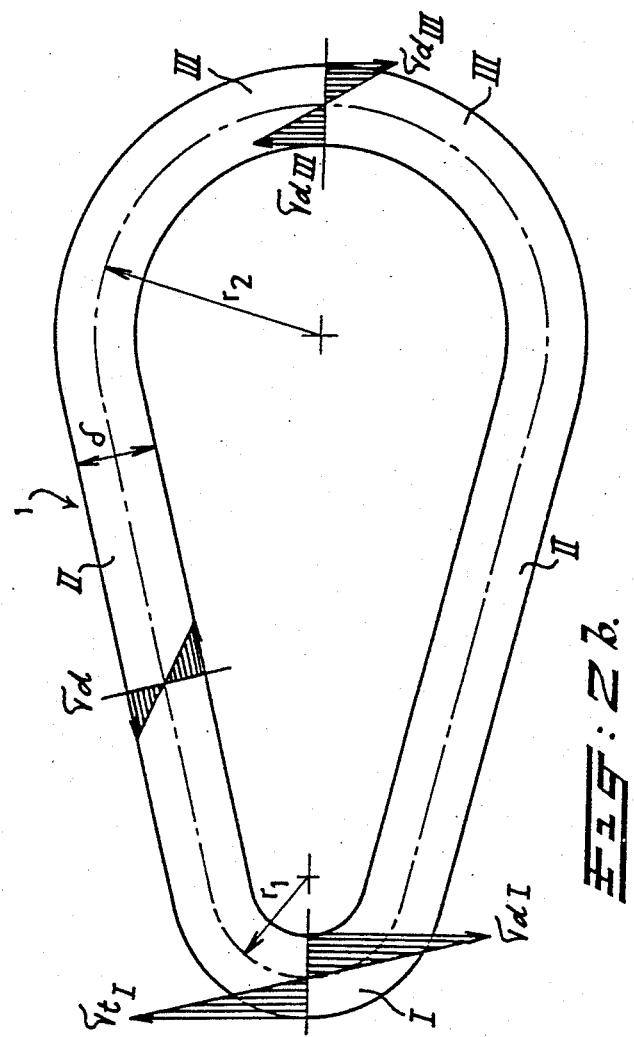

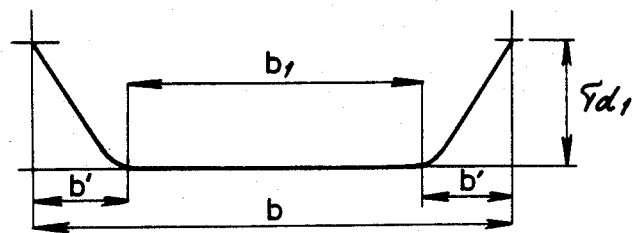
FIG: 7a.
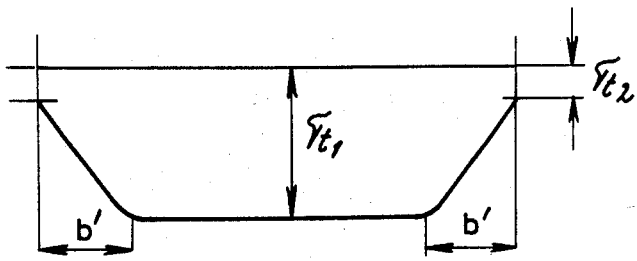
FIG: 7b.
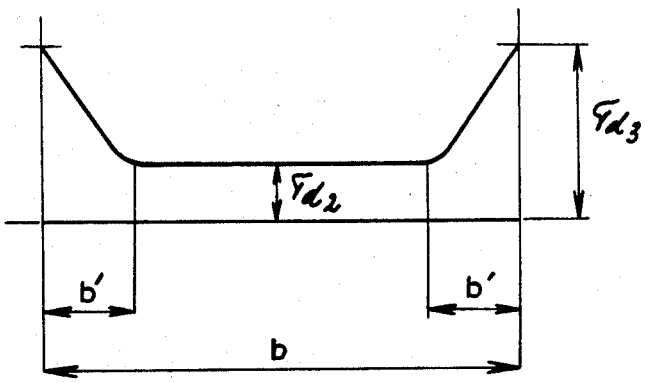
FIG: 7c.

ENDLESS METAL BELT

BACKGROUND OF THE INVENTION

The invention relates to an endless metal belt of the type which is subjected to varying bending and tensile stresses during operation.

Such an endless metal belt can be used e.g. as a conveyor belt or part of a conveyor belt group in a continuous variable transmission of the type described in U.S. Pat. Spec. No. 3,949,621, or in a transmission of the type described in U.S. Pat. Spec. No. 2,920,494. In both cases the belt is subjected to varying and often very great bending and tensile stresses during operation, which means that the belt is under very great mechanical strain; belt breakage is therefore not an uncommon occurrence. Such breakage means that the whole transmission immediately becomes unserviceable, with all the consequences which this entails.

SUMMARY OF THE INVENTION

The object of the invention is to produce an endless metal belt which can be subjected to greater strains than the belts known hitherto, and which has, when subjected to the usual stresses, a considerably longer service life. This is achieved according to the invention by incorporating permanent compression stresses in at least the belt edge zones.

The invention is based on the idea that by reducing in this way the stresses occurring in the edge zones, in particular the tensile stresses caused by the bending stress, the strain on the belts will not be so great, as a result of which belt breakage caused by hairline cracks occurring from the edges, with the accompanying stress concentrations, is largely avoided.

This incorporating of permanent compression stresses in at least in the belt edge zones is possible by plastic deformation of the belt material. This deformation can be achieved by rolling or by shot peening of the zones concerned. Particularly good results are obtained where the plastic deformation of the belt material forms edge zones with decreasing thickness towards the end edges, which means that the beneficial effect of incorporating compression stresses is combined with that of the decreasing edge zone thickness.

BRIEF DESCRIPTION OF THE DRAWINGS

FIG. 1 is a schematic illustration of a continuous variable transmission in which the endless belt according to the invention is used.

FIG. 2b shows the configuration of such a belt during operation in a continuous variable transmission, and the stresses occurring during operation are indicated in this figure.

FIGS. 7a, 7b and 7c illustrate the possible stresses occurring in an endless metal belt.

DESCRIPTION OF A PREFERRED EMBODIMENT

FIG. 1 shows schematically a continuous variable transmission (CVT) with a conveyor belt 2 which is made up of endless thin belts 1, and on which there are an endless continuous series of cross elements 3 which slide freely thereover. They move between the pulleys with variable diameter 4 and 5. Such a continuous variable transmission is known per se.

Figure 2A:
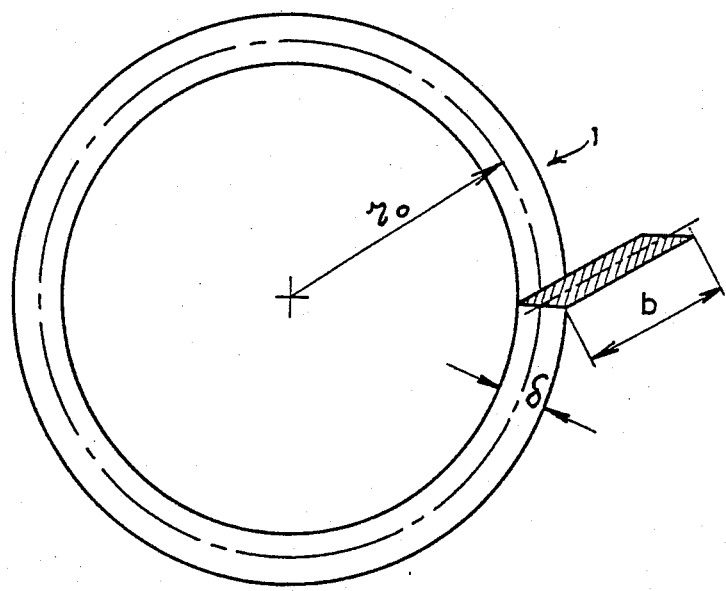
FIG. 2a shows an endless metal belt in the tensionless state.

With reference to FIGS. 2a and 2b it will now be ascertained what stresses (tensile and compression stresses) occur in the belts during operation. It is assumed here that the thin belts are made in such a way that in the starting position they are tensionless, so that a freely supported belt naturally assumes a circular shape. FIG. 2a shows such a belt 1 with breadth b and thickness $\delta$ which for the sake of clarity is drawn in very exaggerated fashion. The tensionless radius of the belt is $r_o = L/2\pi$ in which L is the length of the belt.

When such a belt assumes the configuration shown in FIG. 2b, thus the configuration which the belt has in the transmission, different bending stresses occur in all cross sections, and the said bending stresses can consist of tensile stresses and compression stresses. With a symmetrical cross section the tensile stress is equal here to the compression stress.

On the basis of the tensionless radius $r_o$, it is generally so that with a bending radius r the bending stress occurring is equal to:

$$b = \delta/2 \; E \, |1/r - 1/r_o\uparrow$$

On the basis of this basic equation, it appears that in the most curved part of the belt 1 with radius $r_1$, indicated by I, a tensile stress occurs on the outside and an equally great compression stress on the inside; both are equal to:

$$\tau t_I = \tau d_I = \delta/2.E \; |1r_1 - 1/r_o \uparrow$$

In the straight parts II, due to the deformation of the belt to the shape shown in FIG. 2b, a compression stress occurs on the outside and a tensile stress on the inside; here again, the compression stress is equal to the tensile stress:

$$\tau t_{II} = \tau d_{II} = \delta/2.E \; |1/\infty - 1/r_o \uparrow \; = \delta/2.E(1/r_o)$$

Finally, in the less curved part III with radius $r_2$, a tensile stress $\tau t_{III}$ occurs again on the outside and a compression stress $\tau d_{III}$ on the inside, determined by the equation:

$$\tau t_{III} = \tau d_{III} = \delta/2.E \; |1/r_2 - 1/r_o \uparrow$$

As could be expected, it appears that the tensile and compression stresses are greatest in the most curved part of the belt, but also that during operation, i.e. when the belt is turning, greatly fluctuating bending stresses occur. For example the compression stress occurring on the outside of part II on running into part I with radius $r_1$ passes into a considerably greater tensile stress in the opposite direction and, for example, the tensile stress occurring on the outside of part III changes over to a compression stress in the straight part.

In addition, during operation not only alternating tensile and compression stresses caused by the bending, but also tensile stresses always occur in the belt which, depending on the system used, have either a practically constant relatively high value or can vary with the moment to be transmitted.

The stresses occurring during operation are therefore high and fluctuating, so that the belts are under a very heavy strain; in practice, a breakage can therefore occur, which makes the transmission completely unserviceable within a short period of time. Since pulleys and belt are accomodated in a closed housing and the fitting of a new belt involves removal of a large number of parts, a belt breakage not only causes the user a great deal of trouble, but also leads to high repair costs. It is therefore important to produce a belt which results in the best possible strain. The invention indicates a way of achieving this objective.

Figure 3:
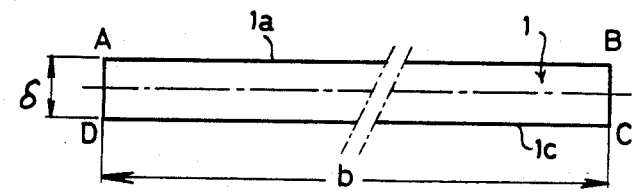
FIG. 3 is a cross section of an endless metal belt.

FIG. 3 shows schematically a cross section through a belt with breadth b, thickness $\delta$, and with the corner points A, B, C, D. When such a belt is loaded during operation with a tensile force F which—as indicated above—can either be constant or fluctuating, as a result of this tensile force F a tensile stress $\tau_t' = F/b$ also occurs in the belt. This stress is superimposed on the above-mentioned bending stresses. This tensile stress $\tau_t'$ is the same over the entire cross section, while the bending stresses are not the same: they depend on the distance to the neutral line and are highest on the outside or inside. On the outside surface 1a of the belt on the small pulley the bending stress, which is a tensile stress ($\tau t_1$), is in the same direction as the tensile stress $\tau_t'$, while on the inside surface 1c the two stresses counteract each other. This means that of the four corner points A, B, C, D (see FIG. 3) of the cross section the highest—and also fluctuating—stresses occur in the corner points A and B situated at the ends of the outside surface, as a result of which this is the first place where the hairline cracks caused by fatigue and leading to final breaking of the belt will occur. Experiments have confirmed this.

Figure 4:
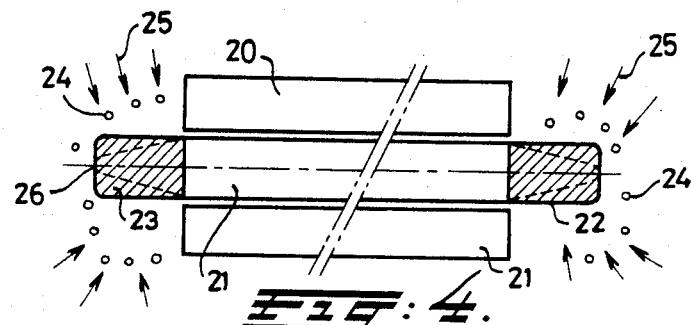
FIG. 4 illustrates a process for plastic deformation of the edge zones of an endless belt.

According to the invention the tensile stresses are reduced by introducing permanent compression stresses in the belt. These compression stresses can be incorporated locally in the belt: if they are present in the end zones, the result is that the level of the tensile stresses occurring there is reduced. However, compression stresses can also be incorporated in the central zone, in order to reduce the tensile stresses prevailing there. FIG. 4 shows schematically a belt 21 which is gripped in a suitable holder 20, and of which the end zones 22, 23 hatched in the drawing are subjected to a treatment by shot peening, schematically indicated by the particles 24 and arrows 25. This treatment which, as is known per se, leads to the introduction of permanent compression stresses in the belt surface, can be carried out to such an extent that the belt assumes the configuration as indicated in FIG. 4 by the dotted line 26. Of course, other configurations can also be achieved in this way.

Figure 5:
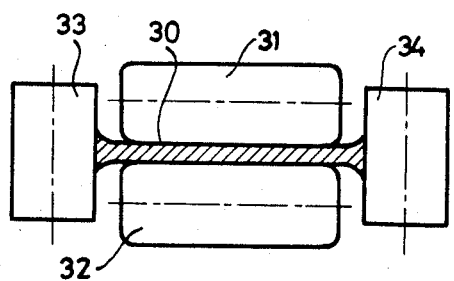
FIGS. 5 and 6 illustrate a possible rolling treatment such a belt.
Figure 6:
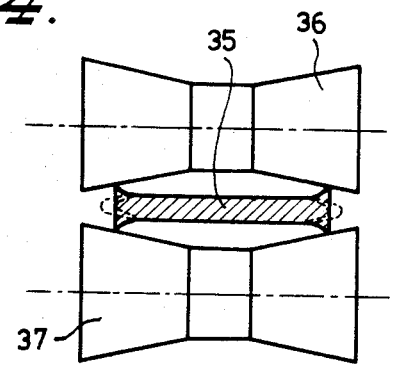

The incorporation of permanent compression stresses is also possible by means of a rolling treatment, in which for example there may or may not first be lateral upset rolling, following by rolling out in the longitudinal direction as schematically indicated in FIGS. 5 and 6 respectively. In FIG. 5 the belt is indicated by the reference FIG. 30, the guide rollers by 31 and 32 and the cross rolling rollers by 33 and 34; in FIG. 6, which illustrates the rolling out in the longitudinal direction, the belt is indicated by the reference FIG. 35 and the rollers are indicated by the reference FIGS. 36 and 37. The expert will easily be able to determine the rolling parameters. The rolling can be carried out in such a way that in the end the configuration shown in FIG. 4, (or a configuration in which the ends do not taper symmetrically) is obtained.

The result will be that the bending stresses $\tau_b$—which are, of course, proportional to the thickness of the belt—also decrease gradually in this zone to the value possibly equal to zero at the end edges and that near these end edges practically only the tensile stress $\tau_t'$ caused by the tensile force F still occurs. The strain on the material is thus considerably lower.

FIGS. 7a, 7b and 7c show the way in which the stress varies over the cross section of the belt as a result of the measure according to the invention. In these figures compression stresses in the Y direction are plotted as positive stresses and tensile stresses in the Y direction as negative stresses, while the breadth b is plotted along the X axis.

FIG. 7a shows how in the edge zones b' of the belt in the idle position there is a compression stress which decreases from a maximum value $\tau d_1$ at the edges over a breadth b' to the value of practically zero. When the same cross section is also subjected to a tensile stress $\tau t_1$ which is greater than the compression stress $\tau d_1$ this tensile stress will—as shown in FIG. 7b—be considerably lower in the edge zones b' than in the centre of the belt: at the end edges the resulting tensile stress only has the value $\tau t_2$. If a compression stress occurs in the belt, e.g. of the magnitude $\tau d_2$, as shown in FIG. 7c, compression stress $\tau d_3$ occurring at the end edges will be considerably higher than the compression stress in the centre of the belt, but high, possibly fluctuating compression stresses can be borne much more easily by the belt than tensile stresses, so that such stresses will hardly have any adverse effect on the life of the belt.

What is claimed is:

1. Endless metal belt for being guided over pulleys and thereby subjected to varying bending and tensile stresses during operation,
   said belt having permanent compression stresses incorporated in at least edge zones of the belt, the belt edge zones being adjacent to longitudinal edges of the belt, for counteracting stresses to which the belt is subjected.

2. Endless belt according to claim 1, wherein the thickness of the belt edge zones decreases towards the longitudinal belt edges.

3. Process for forming an endless metal belt, comprising the steps of:
   (a) providing a metal belt; and
   (b) incorporating permanent compression stresses in at least edge zones of the belt, adjacent to longitudinal edges of the belt, the zones with incorporated compression stresses being formed by plastic deformation of the belt material.

4. Process for forming an endless metal belt according to claim 3, in which belt edge zones with decreasing thickness toward the belt edges are formed by such plastic deformation of the belt material.

5. Process according to claim 3, in which the plastic deformation is carried out by rolling.

6. Process according to claim 4, in which the plastic deformation is carried out by rolling.

7. Process according to claim 3, in which the plastic deformation is carried out by shot peening of belt edge said zones.

8. Process according to claim 4, in which the plastic deformation is carried out by shot peening of belt edge said zones.

9. Process according to claim 3, wherein such permanent compression stresses are incorporated in said edge zones and also in portions of the belt away from said edge zones.

10. Endless metal belt as in claim 1, wherein such permanent compression stresses are incorporated only in said edge zones of the belt.

11. Endless metal belt as in claim 1, wherein such permanent compression stresses are incorporated in said edge zones and also in portions of the belt away from said edge zones.

12. Process according to claim 3, wherein such permanent compression stresses are incorporated only in said edge zones of the belt.

* * * * *